No. 714,324. Patented Nov. 25, 1902.
P. M. OLSEN.
DEVICE FOR PLUMBING AND LEVELING.
(Application filed June 12, 1902.)
(No Model.) 3 Sheets—Sheet 1.
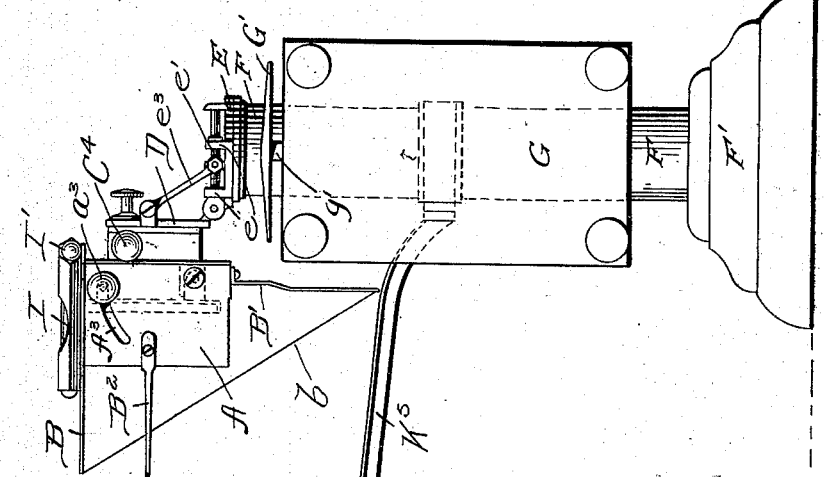
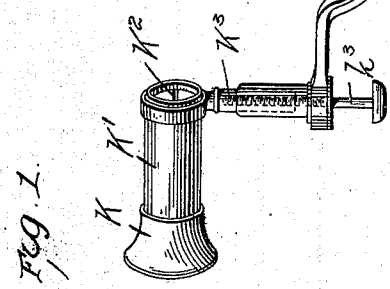
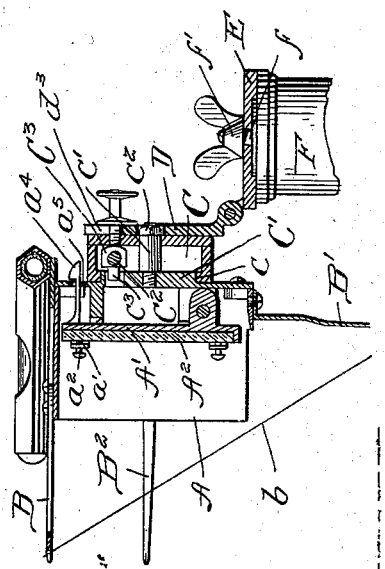
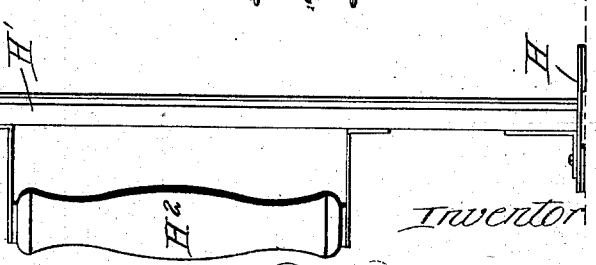
Attest:
C. S. Middleton
Geo. W. Aldom
Inventor
Petter Martin Olsen.
By Richardson
Attys.

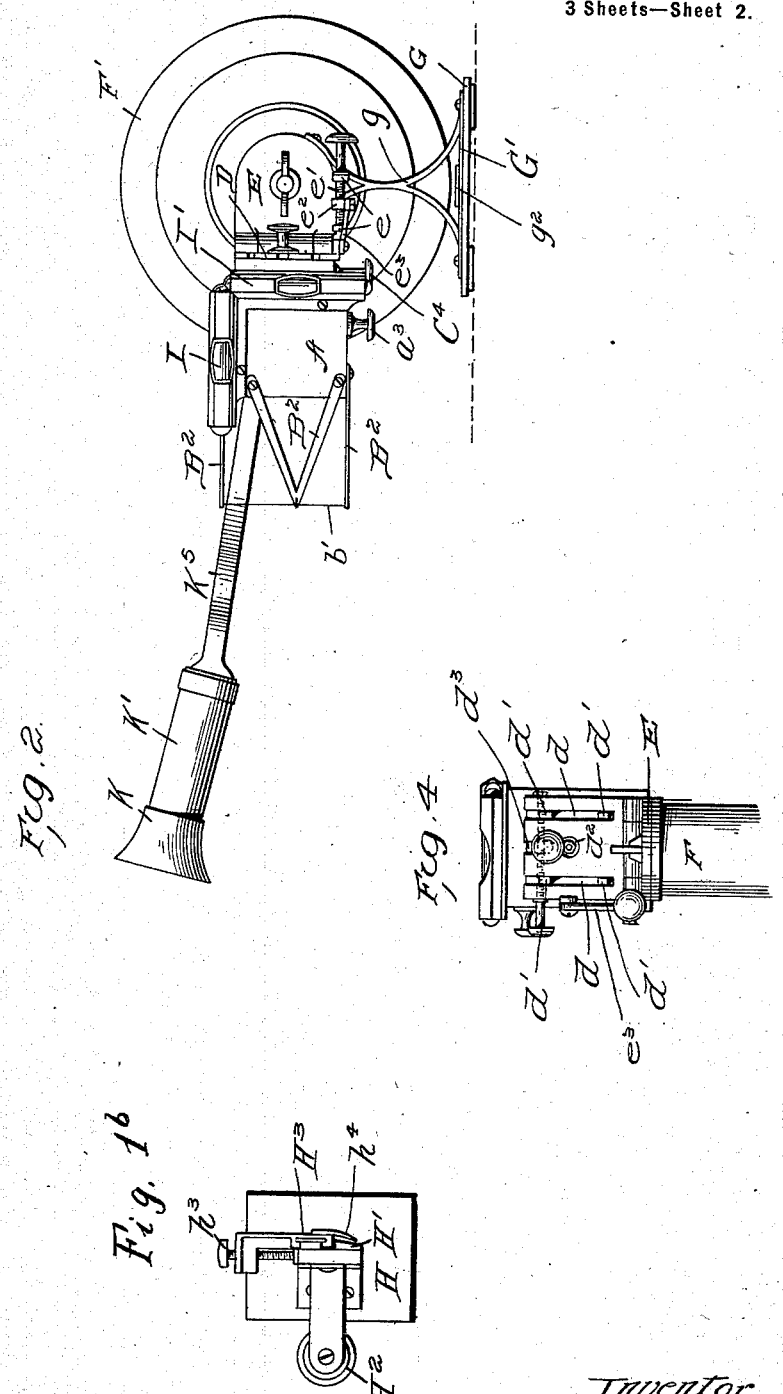

No. 714,324. Patented Nov. 25, 1902.
P. M. OLSEN.
DEVICE FOR PLUMBING AND LEVELING.
(Application filed June 12, 1902.)
(No Model.) 3 Sheets—Sheet 3.
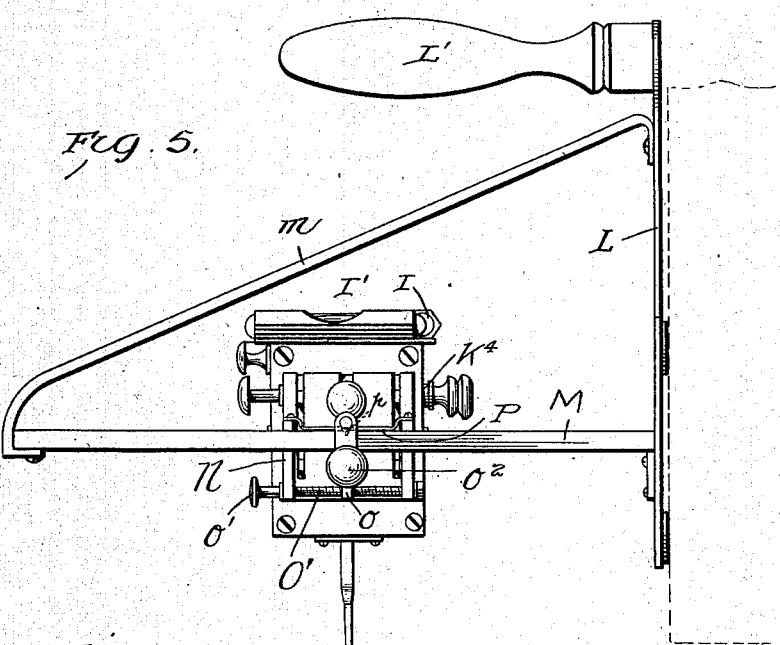
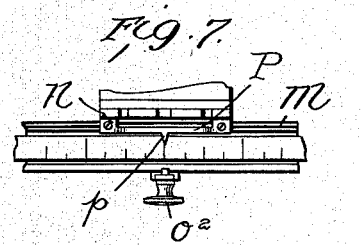
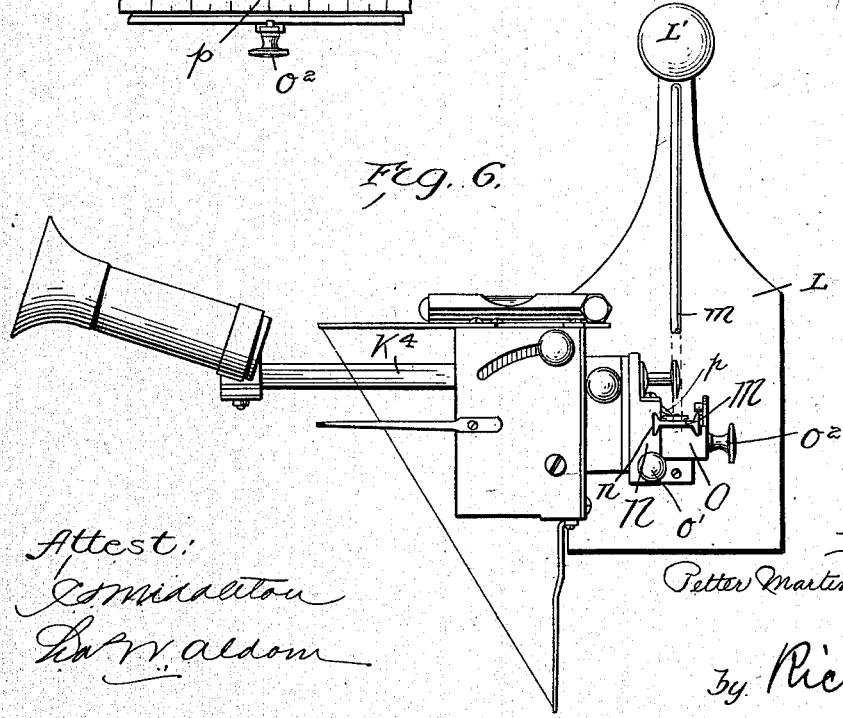
Inventor
Petter Martin Olsen
Attest:
J. S. Middleton
Geo. W. Aldom
By Richards & Co.
Attys

UNITED STATES PATENT OFFICE.

PETTER MARTIN OLSEN, OF BROOKLYN, NEW YORK.

DEVICE FOR PLUMBING AND LEVELING.

SPECIFICATION forming part of Letters Patent No. 714,324, dated November 25, 1902.

Application filed June 12, 1902. Serial No. 111,396. (No model.)

*To all whom it may concern:*

Be it known that I, PETTER MARTIN OLSEN, a subject of the King of Sweden and Norway, and a resident of Brooklyn, New York, have invented certain new and useful Improvements in Devices for Plumbing and Leveling, of which the following is a specification.

My invention relates to improvements in devices for plumbing and leveling; and the object of the invention is to provide a simple and efficient instrument which shall be easy of manipulation and accurate in use and readily convertible, according as to whether it is desirable to use the device for plumbing or for leveling.

The invention is illustrated in the accompanying drawings, in which—

Figure 1 is a side elevation, and Fig. 1$^a$ is a view of the leveling-rod. Fig. 1$^b$ is a top view of Fig. 1$^a$. Fig. 2 is a plan view; Fig. 3, a vertical section of the mirror-box; Fig. 4, a rear elevation of the same. Fig. 5 is a rear elevation of the device as used for plumbing purposes; Fig. 6, a side view of the same. Fig. 7 is a detail view.

According to my invention I use a mirror-box containing a mirror, in front of which are a pair of crossed wires. The mirror-box is held at a suitable distance from one point of the part to be leveled or plumbed, and a scale carrying a suitable pointer is placed on the other part. Thus by looking through an eyepiece arranged at an angle to the plane of the mirror the pointer on the scale can be brought into line with the crossing-point of the wires, and the readings on the scale will determine whether the two points are level or plumb.

The mirror-box is shown at A and consists simply of a box or frame open at the front and bottom and having within it a suitable pivotal frame A', to which is secured by lugs $a'$ and set-screws $a^2$ a mirror A$^2$. A curved slot A$^3$ is formed in the side of the mirror-box, through which projects an operating-handle $a^3$, which is preferably in the form of a thumb-screw, by which the mirror-frame can be clamped against movement, if desired. A catch $a^4$ is also provided on the back of the mirror-frame, coöperating with a recess or opening $a^5$ in the back of the mirror-box, which insures the holding of the mirror in vertical position when the instrument is used for leveling. An arm B projects horizontally from the top of the box and another arm B' depends from the back of the box, and the extremities of these arms are connected by a wire $b$. The horizontal wire $b'$ is carried by the extremities of two arms B$^2$ B$^2$, projecting horizontally forward from the sides of the mirror-box, as shown.

The mirror-box is carried by a suitable support, hereinafter more fully described, and is designed to be rotated thereon so that it may be fixed toward any direction, and it is also adapted to be tilted up and down or oscillated sidewise in order to have the top of the mirror-box perfectly horizontal when in use. The oscillating or rocking movement is secured by providing an adjusting-box C on the back of the mirror-box, which is provided on one face with a circular opening $c$, which receives a circular flange or projection C', formed on the mirror-box, whereby the mirror-box may rock or oscillate in the adjusting-box, and yet be held against loose movement. The mirror-box is held in place by a spindle $c'$, projecting through an opening in the rear of the adjusting-box, where it is rotatably secured by a nut $c^2$. In order to provide accurate adjustment of the mirror-box with relation to the adjusting-box, I mount a screw-shaft C$^2$ transversely of the adjusting-box and provided within the box with a nut C$^3$, having a projection $c^3$, adapted to engage an opening or recess in the back of the mirror-box. Thus by rotating the screw by the handle portion C$^4$ the nut is caused to travel on the screw and by its engagement with the opening in the mirror-box to rock or oscillate it from side to side, the box at other times remaining rigidly held with relation to the adjusting-box. In order to tilt the mirror-box up and down, I provide a plate D, which is hinged to a cap E on the top of the supporting-pillar, and the plate D can be adjusted or rocked on its pivot in the manner hereinafter described. The connection of the adjusting-box to the plate D is a removable one, removability being desired for the adaptation of the mirror-box for plumbing instead of leveling in the manner hereinafter set forth. The form of the removable connection which I prefer consists in providing the plate B with vertical slots or recesses $d$, which receive projections $d'$ on the back of the adjusting-box, and opening $d^2$ is provided in the plate for the reception of the nut on the back of the adjusting-box, and a slot $d^3$ serves for the passage of a thumb clamping-screw by which the adjusting-box is firmly clamped to the plate. The cap E carries two lugs $e$, in which is journaled a screw-shaft $e'$. On the shaft between the lugs is a traveling nut $e^2$, which is connected by a pivotal link $e^3$ with the side of the plate D.

The rack E is rotatably mounted upon a pillar F and is preferably removably held thereon by a threaded spindle $f$ and nut $f'$. The pillar is representative of any suitable support or standard and is mounted upon a suitable base F', as shown.

When the instrument is used for leveling foundations and like horizontal surfaces, it rests upon the base F'. It frequently happens, however, that it is desirable to ascertain the comparative heights of two points upon a vertical surface or wall, and to enable the instrument to be held steady for this purpose I provide a vertical plate G, which is connected with the pillar by arms or brackets $g$. A pointer G' has a shank $g'$ slidably supported in guides $g^2$ on the rear face of the plate G. The leveling-rod, in connection with which the instrument just described is used, is shown in Figs. 1ª and 1ᵇ and comprises simply a plate H, to which is secured a scale-bar H', provided with a handle H², by means of which it may be conveniently held. A target H³ is mounted to slide on the scale-bar and is adapted to be clamped in any desired position by a set-screw $h^3$. The target is provided with a pointer $h^4$, extending over the scale, which is preferably painted white, and the white may be continued in a line across the face of the target, which is preferably painted black.

From the foregoing description it is thought that the operation of the device in leveling will be readily understood, but it may be briefly stated as follows: Supposing that two portions of the foundation of a building are to be leveled, the base F' of the pillar F is placed upon one of the portions of the foundation, while the plate H of the scale is placed upon the other foundation. The mirror-box is then adjusted in the manner which has been described until its top is perfectly level, and this is determined by spirit-levels I I', placed at right angles to each other upon the top of the box. The mirror is then adjusted into a vertical position, and by looking into the mirror-box at an angle the reflection of the wires will be seen therein. With the eye held so that the horizontal wire and the reflection thereof on the mirror corresponds the eye will of course be on a perfect level with the horizontal wire, and if the mirror-box is fixed in the right direction the leveling scale or target will also be seen reflected in the mirror. Then the target-man will adjust the target up or down until it is in line with the horizontal wire, and the height of the horizontal wire above the pedestal being known the reading on the scale of the target or leveling-rod will show whether or not the two portions of the foundation are on the same level.

To assist the eye in getting at the proper level, I provide an eyepiece K, which has a tubular portion K', which is closed with the exception of an elongated slit K². An arm K⁵, extending from the pillar, supports this eyepiece when the instrument is used for leveling, upon the extremity of which the eyepiece is adjustably mounted by having a sliding piece K³, which is adjusted vertically by an adjusting screw-rod $k^3$, as shown. The arm K⁵ is mounted to swing horizontally on the pillar. The slit in the eyepiece, it will be understood, is turned or located horizontally when the instrument is used for leveling and vertically when it is used for plumbing. When the instrument is used for plumbing, however, I mount the eyepiece on an arm K⁴, projecting from the side of the mirror-box.

I will now describe the means whereby the mirror-box is adapted to be used for plumbing purposes.

Referring to Figs. 5 and 6, L represents a plate designed to be placed against the vertical side of the wall to be plumbed and provided with a suitable handle L'. A bar M is connected with this plate at right angles thereto and is suitably braced by a brace-rod $m$. The bar is preferably I shape in cross-section, and on one side is located a plate N, which has a dovetailed groove $n$, adapted to engage the flanges on that side of the bar. A block O is arranged to slide on the under side of the bar and has a lug $o$, which is provided with a threaded opening, through which passes a screw O', provided with a milled head $o'$. The block and plate are designed to be slid along the bar to any desired position and the block then clamped by a set-screw $o^2$, and after this a more accurate adjustment of the plate is secured by the screw O', the rotation of which causes the plate to be moved relatively to the block. The bar M carries on its upper face between the flanges a scale, and a pointer $p$ indicates the precise point on the scale. This pointer is preferably carried by a leaf-spring P, which bears on the flange of the bar and prevents the too free movement of the plate. It will be observed that the plate is provided with the same arrangement of slots or recesses as is the plate which is carried by the pillar before described, and thus the adjusting-box may be readily removed from the pillar and applied to the plate M to adapt the device for plumbing purposes. The operation in plumbing is precisely the same except that the mirror in the mirror-box is adjusted to an angle of forty-five degrees and the plates H and L are placed against the vertical wall to be plumbed.

When the instrument is used for plumbing, the eyepiece is carried by an arm K⁴, as shown in Fig. 6, the arm being removably secured to the side of the mirror-box.

I claim as my invention—

1. In a device of the character described, a box having an open side, a mirror mounted therein, and wires held in front of said mirror-box in horizontal and vertical planes, substantially as described.

2. In a device of the character described, a box having an open front and an open bottom, a horizontal wire in front thereof, a wire arranged in a vertical plane but inclining rearwardly beneath said open bottom, a mirror within said box, and means whereby said mirror may be held either in a vertical position or at an angle of forty-five degrees, substantially as described.

3. In combination, a suitable support, a mirror-box carried thereby, a mirror held within said box and adjustable into either a vertical or an inclined position, said mirror-box having an open front and an open bottom, arms projecting from the front and back of said box, a wire connecting the extremities of said arms, arms projecting from the sides of said box, and a wire connecting the extremities of said arms, substantially as described.

4. In combination a suitable support, a plate adjustably carried thereby, an adjusting-box detachably carried by said plate, a mirror-box adjustably carried by said adjusting-box, a mirror within said mirror-box, and crossing wires in front of said mirror, substantially as described.

5. In combination, a suitable support, a plate adjustably carried thereby, an adjusting-box detachably carried by said plate, a mirror-box adjustably carried by said adjusting-box, a mirror within said mirror-box, means for adjusting said mirror into either a vertical or an inclined position, a horizontal wire in front of said mirror, and an inclined wire located in a vertical plane in front of said mirror, substantially as described.

6. In combination, a suitable support, a plate adjustably carried thereby, an adjusting-box detachably carried by said plate, a mirror-box adjustably carried by said adjusting-box and having an open front and bottom, a mirror hinged within said mirror-box and adjustable into either a vertical or inclined position, a horizontal wire supported in front of said mirror-box, and an inclined wire in front of said mirror-box inclining rearwardly beneath the same, substantially as described.

7. In combination, a suitable support, a mirror-box having detachable connection therewith, said mirror-box having an open front and bottom, a mirror hinged within said mirror-box and adjustable into either a vertical or inclined position, a horizontal wire supported in front of said mirror-box, and an inclined wire in front of said mirror-box inclining rearwardly beneath the same, substantially as described.

8. In combination, a suitable support, a mirror-box having an adjustable and a detachable connection therewith, said mirror-box having an open front and bottom, a mirror hinged within said mirror-box and adjustable into either a vertical or inclined position, a horizontal wire supported in front of said mirror-box, and an inclined wire in front of said mirror-box inclining rearwardly beneath the same, substantially as described.

9. In combination, a suitable support, a plate adjustably carried thereby, an adjusting-box detachably carried by said plate, a mirror having a rotatable connection with said adjusting-box, a screw-shaft journaled in said adjusting-box, a nut on said shaft having an operating connection with said mirror-box, an adjustable mirror in said box and crossing wires coöperating with said mirror, substantially as described.

10. In combination, a plate D having parallel slots, an adjusting-box having lugs or projections on its rear side engaging said slots, a securing-screw connecting said box and plate, a mirror-box having a circular flange on its rear face engaging a corresponding opening in the mirror-box, a spindle connecting said mirror-box and adjusting-box and means for adjusting said mirror-box with relation to the adjusting-box, substantially as described.

11. In combination, a plate D having parallel slots, an adjusting-box having lugs on its rear side engaging said slots, a securing-screw connecting said box and plate, a mirror-box having a circular flange on its rear face engaging a corresponding opening in the mirror-box, a spindle connecting said mirror-box and adjusting-box, and means for adjusting said mirror-box with relation to the adjusting-box comprising a screw-shaft journaled in said adjusting-box out of line of said spindle, and a nut on said shaft having a projection engaging an opening in the rear wall of the mirror-box, substantially as described.

12. In combination, a mirror-box suitably supported and having an open front and bottom, a frame hinged therein, a mirror carried by said frame, a handle secured to said frame and projecting through an arc-shaped slot in the side of the box, and horizontal and inclined wires coöperating with said mirror, substantially as described.

13. In combination, a mirror-box suitably supported and having an open front and bottom, a frame hinged therein, a mirror carried by said frame, a handle secured to said frame and projecting through an arc-shaped slot in the side of the box and a catch on the back of the mirror-box for holding the mirror in a vertical position and horizontal and inclined wires coöperating with said mirror, substantially as described.

14. In combination, a support, a plate hinged thereto with means for adjusting said plate, an adjusting-box detachably connected to said plate and a mirror-box adjustably connected to said adjusting-box, substantially as described.

15. In combination, a mirror-box having an open front and bottom, a mirror held within said box and adjustable to either a vertical or inclined position, an arm projecting forward from the top of said box, a second arm projecting downward from the bottom of said box, a wire connecting the extremities of said arms, a pair of horizontal arms projecting forward from the sides of said box, a wire connecting the extremities of said horizontal arms, and means for traveling said mirror-box, substantially as described.

16. In combination, a mirror-box having an open front and bottom, a mirror held within said box and adjustable to either a vertical or inclined position, horizontal and inclined wires coöperating with said mirror-box and means for traveling said mirror-box, substantially as described.

17. In combination, a mirror-box having an open front and bottom, a mirror held within said box and adjustable to either a vertical or inclined position, horizontal and inclined wires coöperating with said mirror, and a sight-guide coöperating with said mirror and wires, substantially as described.

18. In combination, a mirror-box having an open front and bottom, a mirror held within said box and adjustable to either a vertical or inclined position, horizontal and inclined wires coöperating with said mirror, and a sight-guide coöperating with said mirror and wires, said sight-guide comprising a tubular portion having a narrow slit in the end thereof, substantially as described.

19. In combination, the support, a cap rotatably mounted thereon, a plate hinged to said cap with means for adjusting the same, and a mirror-box adjustably connected with said plate, substantially as described.

20. In combination, the support, a cap rotatably mounted thereon, a plate hinged to said cap with means for adjusting the same, and a mirror-box adjustably connected with said plate, an arm connected to said pillar to swing around the same, and a sight-guide carried by said arm, substantially as described.

21. In combination, a support, a mirror-box having an adjustable and rotatable connection therewith, a side plate connected to said pillar, and a pointer or indicator having a sliding connection with said plate, substantially as described.

In witness whereof I have hereunto set my hand in presence of two witnesses.

PETTER MARTIN OLSEN.

Witnesses:
JAMES J. THORNLEY, Jr.,
OTTO MUNK.